US012710789B2

(12) United States Patent
Wang et al.

(10) Patent No.: US 12,710,789 B2
(45) Date of Patent: Aug. 18, 2026

(54) ADD-ON ASSEMBLY, IDENTIFICATION METHOD FOR ADD-ON ASSEMBLY, AND WEARABLE DEVICE

(71) Applicant: BEIJING XIAOMI MOBILE SOFTWARE CO., LTD., Beijing (CN)

(72) Inventors: Xuefeng Wang, Beijing (CN); Lei Meng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 532 days.

(21) Appl. No.: 18/204,373

(22) Filed: May 31, 2023

(65) Prior Publication Data

US 2024/0219960 A1 Jul. 4, 2024

(30) Foreign Application Priority Data

Jan. 4, 2023 (CN) ......................... 202310009980.0

(51) Int. Cl.

| | |
|---|---|
| ***G06F 1/16*** | (2006.01) |
| ***A61B 5/00*** | (2006.01) |
| ***A61B 5/021*** | (2006.01) |
| ***A61B 5/022*** | (2006.01) |
| ***A61B 5/024*** | (2006.01) |
| *A61B 5/28* | (2021.01) |

(52) U.S. Cl.
CPC .................................... *G06F 1/163* (2013.01)

(58) Field of Classification Search
CPC ..... G06F 1/163; A61B 5/022; A61B 5/02141; A61B 5/02438; A61B 5/28; A61B 5/6824; A61B 2562/08; A61B 5/021; A61B 5/6802; A61B 90/98
See application file for complete search history.

(56) References Cited

U.S. PATENT DOCUMENTS

| | | | | |
|---|---|---|---|---|
| 6,037,724 | A * | 3/2000 | Buss | A61B 17/32002 439/71 |
| 2003/0093001 | A1 | 5/2003 | Martikainen | |
| 2017/0105811 | A1* | 4/2017 | Garbus | A61B 90/98 |
| 2017/0248991 | A1* | 8/2017 | Fauci | G02C 11/04 |
| 2019/0074120 | A1 | 3/2019 | Maatta et al. | |
| 2020/0202083 | A1 | 6/2020 | Vartiovaara | |
| 2021/0244298 | A1* | 8/2021 | Nishida | A61B 5/0225 |

(Continued)

FOREIGN PATENT DOCUMENTS

| | | | |
|---|---|---|---|
| CN | 115166368 | A | 10/2022 |
| WO | 2021129036 | A1 | 7/2021 |
| WO | 2022143312 | A1 | 7/2022 |

OTHER PUBLICATIONS

Search translation of WO 2021129036 A1 (Year: 2021).*
Extended European Search Report of EP Application No. 23180124.2 dated Nov. 27, 2023, (8p).

*Primary Examiner* — Justin Xu
(74) *Attorney, Agent, or Firm* — Arch & Lake LLP

(57) ABSTRACT

An add-on assembly includes multiple different sub-assemblies, each of the sub-assemblies is provided with a magnetic absorption part, the magnetic absorption part of each of the sub-assemblies is used for adsorbed-connection with a device main body of a wearable device, the magnetic absorption parts of any two of the sub-assemblies are different, and each of the sub-assemblies is identified by the device main body through the magnetic absorption part.

18 Claims, 9 Drawing Sheets

(56) References Cited

U.S. PATENT DOCUMENTS

| | | | | |
|---|---|---|---|---|
| 2022/0015703 | A1* | 1/2022 | Mirov | A61B 5/6817 |
| 2022/0107663 | A1* | 4/2022 | Olafsson | H04L 67/02 |
| 2022/0386702 | A1* | 12/2022 | Lakraa | A24F 40/60 |
| 2023/0380839 | A1* | 11/2023 | Boubes | A61B 5/686 |

* cited by examiner 23
231
A
A acquiring a magnetic field signal when the magnetic absorption part is attached on the device main body — S10

↓ identifying a sub-assembly according to the magnetic field signal — S20

↓ comparing identified sub-assembly with predetermined sub-assembly, and outputting indication information according to comparison result — S30

ADD-ON ASSEMBLY, IDENTIFICATION METHOD FOR ADD-ON ASSEMBLY, AND WEARABLE DEVICE

CROSS-REFERENCE TO RELATED APPLICATION

This application is based on and claims priority to Chinese Patent Application No. 202310009980.0 filed on Jan. 4, 2023, the disclosure of which is hereby incorporated by reference in its entirety for all purposes.

BACKGROUND

Nowadays, more and more people are using wearable devices. For example, wearable devices with a human blood pressure detection function are one of the important products of mobile and online health monitoring, and have received wide praise from users. Of course, more add-on assemblies can be assembled into the wearable device, such that the wearable device can identify the add-on assemblies and perform the functions corresponding to the add-on assemblies.

SUMMARY

The present disclosure relates to the field of electronic device technologies, and more specifically, to an add-on assembly, an identification method for an add-on assembly, and a wearable device, such that the add-on assembly can be identified by the device main body of the wearable device.

A first aspect of the present disclosure provides an add-on assembly, including multiple different sub-assemblies, in which each of the sub-assemblies includes a magnetic adsorption part, the magnetic adsorption part of each of the sub-assemblies is used for adsorbed-connection with a device main body of a wearable device, the magnetic adsorption parts of any two of the sub-assemblies are different, and each of the sub-assemblies is identified by the device main body through the magnetic adsorption part.

A second aspect of the present disclosure provides an identification method for an add-on assembly, including:

- acquiring a magnetic field signal when the magnetic adsorption part is adsorbed on the device main body;
- identifying a sub-assembly according to the magnetic field signal; and
- comparing an identified sub-assembly with a predetermined sub-assembly, and outputting indication information according to a comparison result.

A third aspect of the present disclosure provides a wearable device, including:

- a device main body including a magnetic field sensor, a processor and a magnetic adsorption fitting part; and
- an add-on assembly including multiple different sub-assemblies, in which each of the sub-assemblies includes a magnetic adsorption part, the magnetic adsorption part of each of the sub-assemblies is used for adsorbed-connection with a device main body of a wearable device, the magnetic adsorption parts of any two of the sub-assemblies are different, and each of the sub-assemblies is identified by the device main body through the magnetic adsorption part, the magnetic adsorption fitting part can be in absorbed-connection with the magnetic adsorption part of any one of multiple sub-assemblies, the magnetic field sensor is used for acquiring a magnetic field signal when the magnetic adsorption part and the magnetic adsorption fitting part are in an adsorbed state and outputting the magnetic field signal to the processor, and the processor identifies the sub-assembly according to the magnetic field signal.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise indicated. The implementations in the following description of exemplary embodiments do not represent all implementations consistent with the present disclosure. Instead, they are merely examples of apparatuses and methods consistent with some aspects of the present disclosure.

The terminology used in the present disclosure is for the purpose of describing specific embodiments only and is not intended to limit the present disclosure. Unless otherwise defined, technical terms or scientific terms used in the present disclosure shall have the ordinary meanings as understood by those of ordinary skills in the art to which the present disclosure belongs. The terms “first”, “second” and the like used in the present disclosure do not indicate any order, quantity or importance, but are only used to distinguish different components. Similarly, similar words such as “one” or “an/a” do not mean quantity limitation, but mean that there is at least one, it will be explained separately if only “one” is referred to. “Multiple” or “several” means two or more. Unless otherwise specified, similar words such as “front”, “rear”, “lower” and/or “upper”, “top” and “bottom” are only for convenience of explanation, and are not limited to a position or a spatial orientation. Similar words such as “including” or “containing” mean that the elements or objects before “including” or “containing” now cover the elements or objects listed after “including” or “containing” and their equivalent elements or objects, but do not exclude other elements or objects. Similar words such as “connected” or “connection” are not limited to physical or mechanical connection, but can include electrical connection, regardless direct or indirect connection.

The present disclosure provides a wearable device, the wearable device includes, but is not limited to, a smart watch and a smart bracelet with a blood pressure detection function, and can also be AR glasses or VR glasses with other additional functions.

Taking a smart watch with a blood pressure monitoring function as an example, the wearable device can be worn on a user’s wrist to facilitate the user obtaining time information. Moreover, as an add-on assembly, a blood pressure detection assembly can also be used to detect the user’s physical signs such as blood pressure and heart rate, so as to achieve prevision of the physical state, thus effectively avoiding dangerous secondary symptoms such as stroke caused by high blood pressure. Therefore, the wearable device realizes the integration of multiple types of functions.

Figure 1:
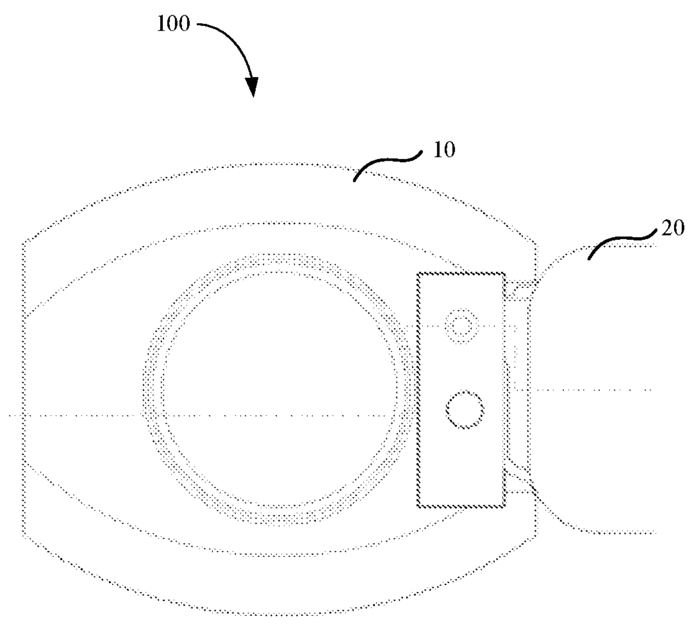
FIG. 1 is a schematic diagram of a partial structure of a wearable device shown according to some embodiments of the present disclosure.
Figure 2:
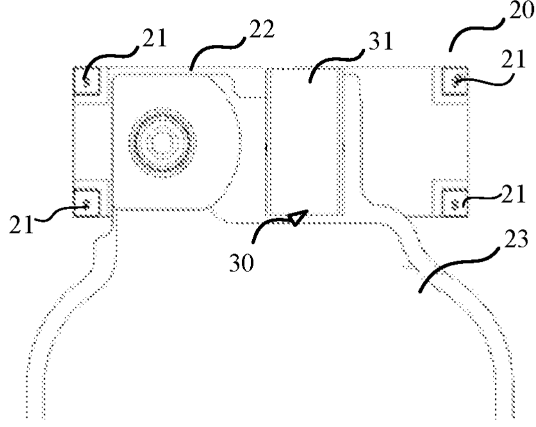
FIG. 2 is a schematic diagram of a partial structure of one of the sub-assemblies shown in FIG. 1 according to some embodiments of the present disclosure.

Referring to FIG. 1 and FIG. 2, FIG. 1 is a schematic diagram of a partial structure of a wearable device 100 shown according to some embodiments of the present disclosure, and FIG. 2 is a schematic diagram of a partial structure of one of the sub-assemblies 20 shown in FIG. 1.

The present disclosure provides a wearable device 100, which includes a device main body 10 and an add-on assembly. The device main body 10 includes, but is not limited to, a dial, a direction indicator, a data display, and smart glasses. The device main body 10 can be worn on a corresponding part of the human body, including but not limited to the head, wrist, and neck. The add-on assembly includes multiple different sub-assemblies 20, and the device main body 10 can be in magnetic absorbed-connection with any one of the sub-assemblies 20, such that the wearable device 100 has the main functions of the device main body 10 and the additional functions of the sub-assemblies 20, to realize integration of multiple types of functions of the wearable device 100.

The “different sub-assemblies 20” mentioned here can be sub-assemblies 20 with different functions, or sub-assemblies 20 with the same functions but different sizes and specifications. For example, respective sub-assemblies 20 can be configured as a blood pressure detection assembly, an electrocardiogram detection assembly, a skin detection assembly, etc., respective sub-assemblies 20 have different functions. For another example, respective sub-assemblies 20 are all configured as a blood pressure detection assemblies, which have the same function, only sizes and specifications of the airbags are different, to adapt to people with different wrist sizes.

As shown in FIG. 2, each sub-assembly 20 of the add-on assembly is provided with a magnetic adsorption part 21, the magnetic adsorption part 21 can be one or more. The magnetic adsorption part 21 of each sub-assembly 20 is used for adsorbed-connection with the device main body 10 of the wearable device 100. The magnetic adsorption parts 21 of any two sub-assemblies 20 are different, and each sub-assembly 20 is identified by the device main body 10 through the magnetic adsorption part 21. That is to say, by means of providing different magnetic adsorption parts 21 on the sub-assemblies 20, respective sub-assemblies 20 can be identified by the device main body 10, such that the functions corresponding to respective sub-assemblies 20 can be enabled. For example, when the device main body 10 identifies that the sub-assembly 20 adsorbed on the device main body 10 is an airbag assembly with a blood pressure detection function, the blood pressure detection program can be enabled.

There are various different implementations to realize the magnetic adsorption part 21 of the sub-assembly 20. In some embodiments, the magnetic adsorption part 21 of each sub-assembly 20 is configured as a permanent magnet, and polarities of the magnetic adsorption parts 21 of any two sub-assemblies 20 are different. That is to say, in the embodiment where the add-on assembly includes two sub-assemblies 20, the magnetic adsorption part 21 of one sub-assembly 20 can be configured as the N pole and the magnetic adsorption part 21 of the other sub-assembly 20 can be configured as the S pole, the device main body 10 can identify respective sub-assemblies 20 according to the magnetic field direction.

In another embodiment, the number of the magnetic adsorption parts 21 of any two sub-assemblies 20 can be set to be different. For example, one sub-assembly 20 has two magnetic adsorption parts 21 and the other sub-assembly 20 has three magnetic adsorption parts 21, such that the device main body 10 can identify respective sub-assemblies 20 according to the number of magnetic field signals acquired.

In another embodiment, the magnetic adsorption parts 21 of any two sub-assemblies 20 are arranged at different positions. For example, the magnetic adsorption parts 21 of one sub-assembly 20 are disposed at the upper left and the lower right respectively, the magnetic adsorption parts 21 of the other sub-assembly 20 are disposed at the lower left and the upper right respectively, such that the device main body 10 can identify respective sub-assemblies 20 according to the magnetic field signals acquired by different pins.

In another embodiment, the magnetic adsorption part 21 of each sub-assembly 20 includes an adsorption surface, and areas of the adsorption surfaces of the magnetic adsorption parts 21 of any two sub-assemblies 20 are different. The magnetic field intensity varies with different areas, and the device main body 10 can identify respective sub-assemblies 20 according to the magnetic field intensity.

In some other embodiments, at least two of the above manners can be combined, thereby realizing the identification of the sub-assembly 20 by the device main body 10.

The magnetic adsorption parts 21 of respective sub-assemblies 20 can adopt a permanent magnet or a magnetic conductor capable of being magnetized. For example, in some embodiments, the magnetic adsorption part 21 of each of the sub-assemblies 20 is configured as a permanent magnet. That is to say, the magnetic adsorption part 21 of each sub-assembly 20 is magnetic, in this case, the device main body 10 can be provided with a magnetic adsorption fitting part with the opposite polarity to the polarity of the magnetic adsorption part 21 or a magnetizable magnetic conductor, such that the sub-assembly 20 can be absorbed and attached on the device main body 10 through the magnetic adsorption part 21.

In another embodiment, the magnetic adsorption part 21 of each sub-assembly 20 is configured as a magnetic conductor, and the magnetic conductor can be magnetized by a magnetic field although it is not magnetic. In this case, the device main body 10 can be provided with a permanent magnet, such that the magnetic conductor can be absorbed on the permanent magnet.

In some other embodiments, a combination of the permanent magnet and the magnetic conductor can also be adopted. Specifically, at least one of the sub-assemblies 20 is provided with multiple magnetic adsorption parts 21, some of the magnetic adsorption parts 21 are configured as permanent magnets, and the rest of the magnetic adsorption parts 21 are configured as magnetic conductors. In this case, the device main body 10 can also be provided with a permanent magnet and a magnetic conductor, the magnetic conductor of the device main body 10 can be fitted with and absorbed on the permanent magnet of the sub-assembly 20, and the permanent magnet of the device main body 10 can be fitted with and absorbed on the magnetic conductor of the sub-assembly 20.

As described above, the functions of respective sub-assemblies 20 in the add-on assembly can be the same or different. In some embodiments, at least one of the sub-assemblies 20 can be provided as an airbag assembly for measuring blood pressure. In this way, it enables the wearable device 100 to integrate the function of blood pressure detection. The present disclosure makes no specific limitation to the functions of other sub-assemblies 20 in the add-on assembly.

In another embodiment, at least two of the sub-assemblies 20 are provided as the airbag assemblies for measuring blood pressure, and models of respective airbag assemblies are different. Specifically, different models of airbag assemblies can be configured according to the wrist size of users of different ages. That is, the airbag assemblies include the airbags 23, and length sizes of the airbags 23 can be different, such that the add-on assembly can be adapted to different groups of people such as children and adults.

In some other embodiments, the multiple sub-assemblies 20 can include multiple sub-assemblies 20 with different functions, for example, at least one sub-assembly 20 is configured as an air bag assembly for measuring blood pressure, and at least one sub-assembly 20 is configured as an electrocardiogram assembly for measuring electrocardiogram. The magnetic adsorption part 21 on the airbag assembly is different from the magnetic adsorption part 21 on the electrocardiogram assembly. When the airbag assembly and the electrocardiogram assembly are respectively absorbed and attached on the device main body 10 of the wearable device, the device main body 10 identifies whether it is currently cooperating with the airbag assembly or the electrocardiogram assembly based on the difference in the magnetic suction parts 21 of the two assemblies. In some embodiments, the sub-assemblies 20 with different functions are not limited to the airbag assembly for measuring blood pressure and the electrocardiogram assembly for measuring electrocardiogram, but can also be a blood oxygen assembly for measuring blood oxygen and a heart rate assembly for measuring heart rate.

Figure 3:
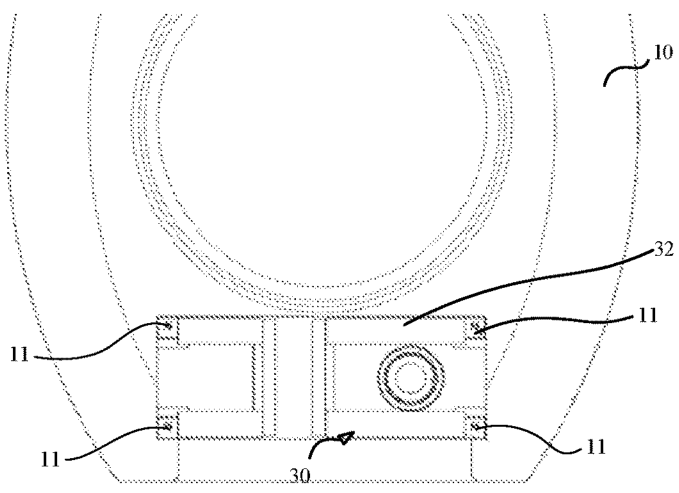
FIG. 3 is a schematic diagram of the wearable device shown in FIG. 1 with sub-assemblies being detached according to some embodiments of the present disclosure.

Referring to FIG. 3, FIG. 3 is a schematic diagram of the wearable device 100 shown in FIG. 1 with sub-assemblies 20 being detached.

The device main body 10 includes a magnetic field sensor, a processor (not shown in FIG. 3) and a magnetic adsorption fitting part 11. The magnetic adsorption fitting part 11 can be in absorbed-connection with the magnetic adsorption part 21 of any one of the multiple different sub-assemblies 20. The magnetic field sensor acquires magnetic field signals when the magnetic adsorption part 21 and the magnetic adsorption fitting part 11 are in an adsorbed state, and outputs the magnetic field signals to the processor, and the processor identifies the sub-assemblies 20 according to the magnetic field signals. Due to the different magnetic adsorption parts 21 of the sub-assemblies 20, the magnetic field signals received by the processor are different, such that the respective different sub-assemblies 20 can be identified correspondingly. The magnetic field sensor can adopt a Hall sensor. The specific implementation of the adsorption fitting between the magnetic adsorption part 21 and the magnetic adsorption fitting part 11 has been described above, and will not be repeated here.

In the wearable device 100 provided by the present disclosure, the magnetic adsorption part 21 of the sub-assembly 20 is correspondingly absorbed on the magnetic adsorption fitting part 11 of the device main body 10, such that the sub-assembly 20 is mounted on the device main body 10, and it is realized that the sub-assembly 20 can be detached from the device main body 10, which is convenient for users to select and install the sub-assemblies 20 with corresponding functions according to their own needs.

In some embodiments, the device main body 10 is provided with a plurality of magnetic adsorption fitting parts 11 and a plurality of magnetic field sensors, the plurality of magnetic field sensors and the plurality of magnetic adsorption fitting parts 11 are arranged in one-to-one correspondence with each other. The magnetic adsorption part 21 of the sub-assembly 20 is selectively adsorbed with at least one of the multiple magnetic adsorption fitting parts 11 correspondingly, the plurality of magnetic field sensors respectively acquire a magnetic field signal when the magnetic adsorption fitting parts 11 corresponding thereto and the magnetic adsorption part 21 are in an adsorbed state and output the magnetic field signal to the processor, and the processor can identify the sub-assembly 20 based on the magnetic field signal input from the magnetic field sensor. The "arranged in correspondence" here means that the magnetic field sensor is arranged in a magnetic field range where the magnetic adsorption fitting part 11 and the magnetic adsorption part 21 are in the adsorbed state.

The expression "the magnetic adsorption part 21 of the sub-assembly 20 is selectively adsorbed with at least one of the plurality of magnetic adsorption fitting parts 11 correspondingly" here means that the magnetic adsorption part 21 of the sub-assembly 20 is at least one, or can also be multiple. When the magnetic adsorption part 21 of the sub-assembly 20 is set as one, the magnetic adsorption part 21 of the sub-assembly 20 is correspondingly absorbed on one magnetic adsorption fitting part 11 on the device main body 10, and when the magnetic adsorption part 21 of the sub-assembly 20 is set as two, the magnetic adsorption parts 21 of the sub-assembly 20 are correspondingly absorbed on two magnetic adsorption fitting parts 11 on the device main body 10.

In some embodiments, the device main body 10 is provided with a plurality of magnetic adsorption fitting parts 11, the add-on assembly includes a plurality of sub-assemblies 20, which are sub-assembly I, sub-assembly II and sub-assembly III respectively, in which the sub-assembly I is provided with one magnetic adsorption part 21, the sub-assembly II is provided with two magnetic adsorption parts 21, and the sub-assembly III is provided with three magnetic adsorption parts 21. The processor receives a magnetic field signal inputted by one magnetic field sensor when the sub-assembly I is absorbed on the device main body 10; the processor receives magnetic field signals from two magnetic field sensors when the sub-assembly II is absorbed on the device main body 10; the processor receives magnetic field signals from three magnetic field sensors when the sub-assembly III is absorbed on the device main body 10; and the processor can identify the sub-assembly 20 installed on the device main body 10 according to the number of received magnetic field signals.

In another embodiment, the device main body 10 is provided with a plurality of magnetic adsorption fitting parts 11, the add-on assembly includes a plurality of sub-assemblies 20, namely, sub-assembly I, sub-assembly II, and sub-assembly III respectively. The sub-assembly I, the sub-assembly II, and the sub-assembly III each are provided with one magnetic adsorption part 21, and the magnetic adsorption parts 21 in the sub-assembly I, the sub-assembly II, and the sub-assembly III are arranged in different positions, and are respectively absorbed on the magnetic adsorption fitting parts 11 in different positions correspondingly, the plurality of magnetic field sensors are respectively corresponding to different magnetic adsorption fitting parts 11, namely, magnetic field sensor I, magnetic field sensor II, and magnetic field sensor III respectively. With this arrangement, the magnetic field sensor I inputs the magnetic field signal to the processor when the sub-assembly I is absorbed on the device main body 10, the magnetic field sensor II inputs the magnetic field signal to the processor when the sub-assembly II is absorbed on the device main body 10, and the magnetic field sensor III inputs the magnetic field signal to the processor when the sub-assembly III is absorbed on the device main body 10. Since the pins of the processor receiving the magnetic field signals are different, different sub-assemblies 20 can be identified.

In another embodiment, the device main body 10 is provided with a plurality of magnetic fitting parts 11, the add-on assembly includes a plurality of sub-assemblies 20, namely, sub-assembly I and sub-assembly II respectively. The magnetic adsorption parts 21 of the sub-assembly I and the sub-assembly II are made of permanent magnets with opposite polarities. The magnetic adsorption part 21 of the sub-assembly I is configured as the N pole, the magnetic adsorption part 21 of the sub-assembly II is configured as the S pole. Due to different polarities, the magnetic field signals detected by the magnetic field sensor are different. Therefore, the processor can identify the sub-assembly 20 according to the different magnetic field signals when the sub-assembly I and the sub-assembly II are respectively absorbed on the device main body 10.

In another embodiment, the device main body 10 is provided with multiple magnetic adsorption fitting parts 11, the add-on assembly includes multiple sub-assemblies 20, namely, sub-assembly I, sub-assembly II and sub-assembly III. The magnetic field intensities of the magnetic adsorption parts 21 of the sub-assembly I, the sub-assembly II and the sub-assembly III are different, and the magnetic field signals detected by the magnetic field sensor are different. The processor can identify the sub-assembly 20 according to different magnetic field signals when the sub-assembly I, the sub-assembly II and the sub-assembly III are respectively absorbed on the device main body 10.

In some embodiments, the magnetic field signal acquired by the magnetic field sensor is the magnetic field signal when the magnetic adsorption part 21 of the sub-assembly 20 is absorbed on the magnetic adsorption fitting part 11 of the device main body 10. In the embodiment where the magnetic adsorption part 21 is configured as a magnetic conductor, the magnetic adsorption part 21, itself, has no magnetism, and only when it is absorbed on the device main body 10 can the magnetic field signal be acquired by the magnetic field sensor.

In some embodiments, the above examples are only a few specific implementations and do not represent all specific implementations. In some cases, at least two of the above implementations can also be combined into one implementation; other implementations formed according to the principles of this embodiment should also be included in the protection scope of the present disclosure.

In some embodiments, the device main body 10 is provided with multiple magnetic adsorption fitting parts 11 and one magnetic field sensor, the magnetic adsorption part 21 of the sub-assembly 20 is selectively adsorbed on at least one of the multiple magnetic adsorption fitting parts 11, the magnetic field sensor is used for acquiring magnetic field signals when the magnetic adsorption part 21 and the magnetic adsorption fitting parts 11 are in an adsorbed state and outputting them to the processor. That is to say, the sub-assembly 20 can be provided with one or more magnetic adsorption parts 21, in the adsorbed state, the magnetic field sensor can acquire one group of magnetic field signals of the magnetic adsorption part 21 and magnetic adsorption fitting part 11, and can also acquire multiple groups of magnetic field signals of the magnetic adsorption part 21 and the magnetic adsorption fitting part 11, the multiple groups of magnetic field signals of the magnetic adsorption part 21 and the magnetic adsorption fitting part 11 are superimposed magnetic field signals, such that the number of magnetic field sensors can be reduced and the cost can be reduced.

In some embodiments, the magnetic fitting part 11 can be relatively fixed with respect to the device main body 10 by way of bonding, and the magnetic adsorption part 21 can be relatively fixed with respect to the sub-assembly 20 by way of bonding, but it is not limited thereto. The magnetic adsorption fitting part 11 and the magnetic adsorption part 21 are respectively configured as permanent magnets with different polarities, such that the magnetic adsorption fitting part 11 and the magnetic adsorption part 21 attract each other, but it is not limited thereto.

Figure 4:
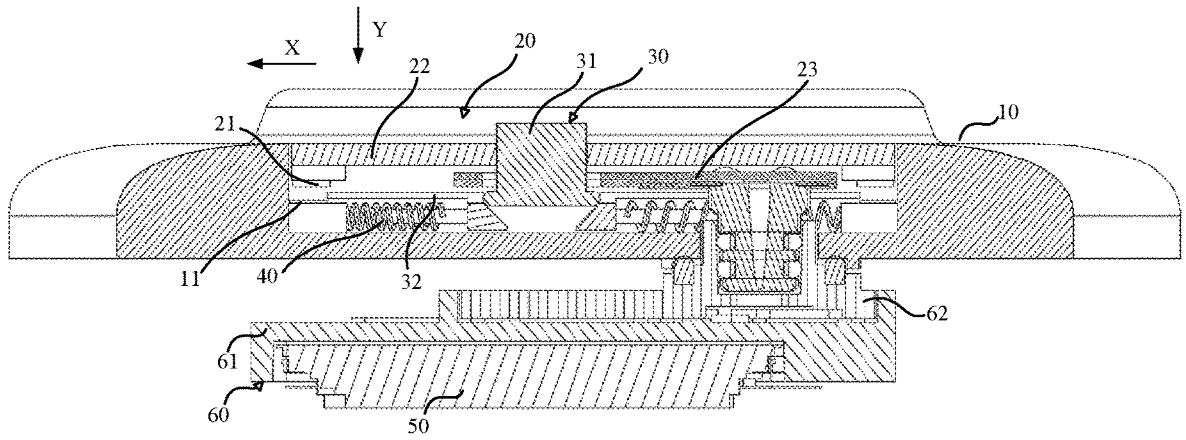
FIG. 4 is a sectional view of a partial structure of the wearable device, in which a magnetic isolation assembly is in a non-magnetic isolation state, according to some embodiments of the present disclosure.
Figure 5:
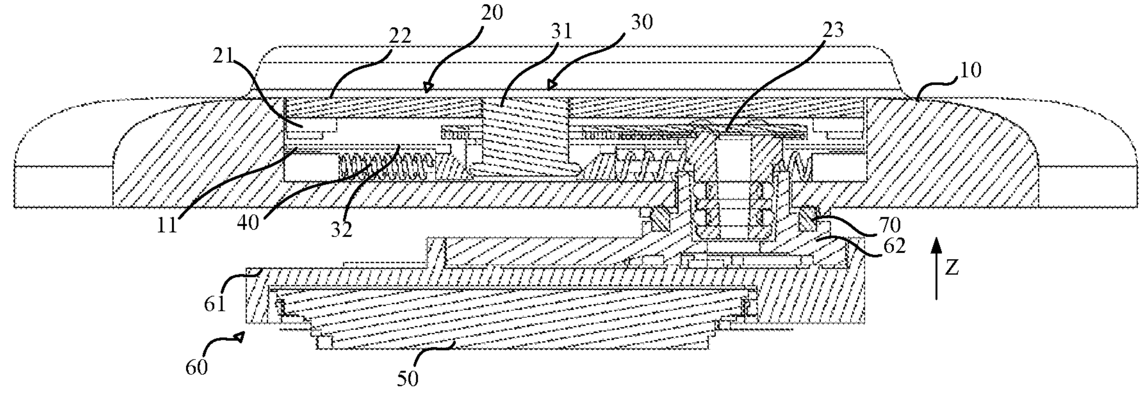
FIG. 5 is another sectional view of a partial structure of the wearable device, in which the magnetic isolation assembly is in a magnetic isolation state, according to some embodiments of the present disclosure.

Referring to FIG. 4 and FIG. 5, FIG. 4 is a sectional view of a partial structure of the wearable device 100, in which a magnetic isolation assembly 30 is in a non-magnetic isolation state. FIG. 5 is another sectional view of a partial structure of the wearable device 100, in which a magnetic isolation assembly 30 is in a magnetic isolation state.

In some embodiments, the wearable device further includes a magnetic isolation assembly 30, and the magnetic isolation assembly 30 has a magnetic isolation state and a non-magnetic isolation state. In the non-magnetic isolation state, the magnetic adsorption fitting part 11 and the magnetic adsorption part 21 attract each other to generate attraction force, such that the sub-assembly 20 can be mounted on the device main body 10 by magnetic attraction force. In the magnetic isolation state, the magnetic isolation assembly 30 can isolate the magnetic adsorption fitting part 11 and the magnetic adsorption part 21, such that the attraction force between the magnetic adsorption fitting part

11 and the magnetic adsorption part 21 decreases or disappears, thereby facilitating the sub-assembly 20 being detached from the device main body 10.

Specifically, the magnetic isolation assembly 30 is movably arranged relative to the sub-assembly 20 and the device main body 10. The magnetic isolation assembly 30 can isolate the magnetic adsorption fitting part 11 and the magnetic adsorption part 21 when it is located between the magnetic adsorption fitting part 11 and the magnetic adsorption part 21, in this case, the magnetic isolation assembly 30 is in a magnetic isolation state, and the sub-assembly 20 can be detached from the device main body 10. The magnetic isolation assembly 30 is in a non-magnetic isolation state when it is located outside the magnetic adsorption fitting part 11 and the magnetic adsorption part 21, in this case, the magnetic adsorption fitting part 11 and the magnetic adsorption part 21 attract each other, and the sub-assembly 20 is mounted on the device main body 10 by the magnetic attraction force. Herein, the magnetic isolation assembly 30 can be movably arranged at the sub-assembly 20; alternatively, the magnetic isolation assembly 30 is movably arranged at the device main body 10; or alternatively, the magnetic isolation assembly 30 is movably arranged at the sub-assembly 20 and the device main body 10, the present disclosure makes no specific limitation thereto.

It can be known from the above description that, the sub-assembly 20 and the device main body 10 are correspondingly provided with the magnetic adsorption fitting part 11 and the magnetic adsorption part 21, such that the sub-assembly 20 can be mounted on the device main body 10 through the mutual attraction of the magnetic fields of the magnetic adsorption fitting part 11 and the magnetic adsorption part 21, and the magnetic force between the magnetic adsorption fitting part 11 and the magnetic adsorption part 21 decreases or disappears through the magnetic isolation assembly 30, such that the sub-assembly 20 can be conveniently detached from the device main body 10. In this way, attachment and detachment can be made according to the use requirements for the sub-assembly 20, such that the wearable device not only realizes the original functions of the device main body 10, but also incorporates the additional functions brought by the sub-assembly 20, and the functional integration degree of the wearable device is improved.

The present disclosure makes no specific limitation to the motion mode of the magnetic isolation assembly 30. For example, the magnetic isolation assembly 30 can be switched between the magnetic isolation state and the non-magnetic isolation state by rotating, or the magnetic isolation assembly 30 can be switched between the magnetic isolation state and the non-magnetic isolation state by moving, or the magnetic isolation assembly 30 can be switched between the magnetic isolation state and the non-magnetic isolation state by a combination of two motion modes.

In this embodiment, the magnetic isolation assembly 30 adopts a separated structure, and the integrated mode with a complex structure is divided into several simple separated parts, such that the processing process of the magnetic isolation assembly 30 can be simplified.

Specifically, the magnetic isolation assembly 30 includes a first part 31 and a second part 32 (refer to FIG. 2 and FIG. 3) which are separately arranged. The first part 31 is movably arranged at the sub-assembly 20, and one end of the first part 31 can extend out of the sub-assembly 20, such that the users can apply an external force to the first part 31. The second part 32 is movably arranged at the device main body 10, and the second part 32 is used for isolating the magnetic adsorption fitting part 11 and the magnetic adsorption part 21. The second portion 32 can be made by adopting the ferrite material, but it is not limited thereto.

In a specific embodiment, the device main body 10 can be provided with a groove, the second part 32 is movably arranged inside the groove. By applying force to the first part 31, the users can make the first part 31 drive the second part 32 to move and switch to the magnetic isolation state, such that the attraction force between the magnetic adsorption fitting part 11 and the magnetic adsorption part 21 decreases or disappears.

The present disclosure makes no limitation to the movement modes of the first part 31 and the second part 32, for example, both the first part 31 and the second part 32 are rotatably arranged; as another example, one of the first part 31 and the second part 32 is arranged to rotate, and the other is arranged to move; and for yet another example, both the first part 31 and the second part 32 are arranged to move.

In this embodiment, the first part 31 is arranged to move in a first direction, the second part 32 is arranged to move in a second direction, and the first direction and the second direction are perpendicular to each other. By moving the first part 31 in the first direction, the second part 32 can be touched and pressed, such that the second part 32 moves in the second direction and is switched to the magnetic isolation state. In this embodiment, the first part 31 and the second part 32 are both arranged to move, and the moving directions are perpendicular to each other, such that the moving spaces of the first part 31 and the second part 32 can be respectively reduced, the structure is simple and the realization is convenient. In the embodiment shown in FIG. 4, the first direction is the vertical arrow Y direction shown in FIG. 4 and the second direction is the horizontal arrow X direction shown in FIG. 4.

Figure 6:
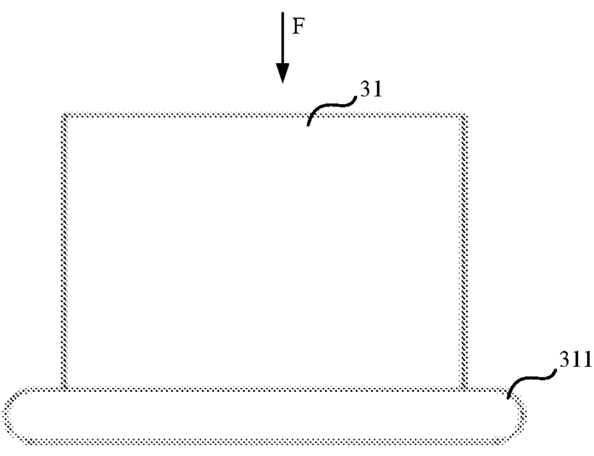
FIG. 6 is a schematic diagram of a first part of the magnetic isolation assembly shown according to some embodiments of the present disclosure.
Figure 7:
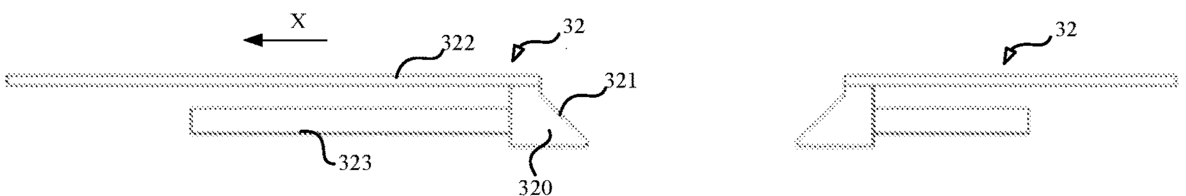
FIG. 7 is a schematic diagram of a second part of the magnetic isolation assembly shown according to some embodiments of the present disclosure.

Referring to FIG. 6 and FIG. 7, FIG. 6 is a schematic diagram of the first part 31 of the magnetic isolation assembly 30 shown according to some embodiments of the present disclosure; FIG. 7 is a schematic diagram of the second part 32 of the magnetic isolation assembly 30 shown according to some embodiments of the present disclosure;

In some embodiments, the first part 31 is provided with a first driving inclined plane, and the first part 31 can touch and press the second part 32 through the first driving inclined plane, such that the second part 32 moves in the second direction.

In this embodiment, the second part 32 is provided with a second driving inclined plane 321, and the first part 31 can touch and press the second part 32 through the second driving inclined plane 321, such that the second part 32 moves in the second direction. Specifically, the bottom of the first part 31, which is in contact with the second driving inclined surface 321, is provided with an arc surface 311, the arc surface 311 can reduce a sliding friction coefficient between the first part 31 and the second driving inclined surface 321 and reduce the wear. The second driving inclined plane 321 is inclined downward with respect to the horizontal plane, and the position closer to the first part 31 is lower. When an external force (the force F in FIG. 6) touches and presses the first part 31, the second driving inclined surface 321 can be touched and pressed through the arc surface 311, in this case, the force F generates a horizontal component force in the second direction, pushing the second part 32 to move in the second direction (the X direction in FIG. 7), such that the second part 32 is switched to the magnetic isolation state.

It should be pointed out that in some other embodiments, the first part 31 can be provided with a first driving inclined plane, and the second part 32 can be provided with a second driving inclined plane 321, the first driving inclined plane and the second driving inclined plane 321 are arranged in parallel and contact with each other, such that power transmission can also be realized, to cause the second part 32 to switch to the magnetic isolation state.

In the embodiment where the magnetic adsorption part 21 and the magnetic adsorption fitting part 11 are respectively arranged as multiple, the magnetic adsorption parts 21 and the magnetic adsorption fitting parts 11 can be provided in one-to-one correspondence. In this implementation, the second part 32 can be arranged as multiple correspondingly, and the first part 31 can drive the multiple second parts 32 to move to the magnetic isolation state under the action of an external force, such that the multiple second parts 32 can isolate the magnetic adsorption parts 21 and the magnetic adsorption fitting parts 11 respectively.

In the embodiment shown in FIG. 7, the second part 32 is arranged as two, each second part 32 is used to isolate at least one group of the magnetic adsorption part 21 and the magnetic adsorption fitting part 11. The multiple second portions 32 can adopt the same structure, for example, each of them is provided with a second driving inclined surface 321, and each of them can be touched and pressed by the arc surface 311 of the first part 31. Of course, the number of the second parts 32 is not limited to two, and three or more can be arranged, which depends on the magnetic adsorption part 21 and the magnetic adsorption fitting part 11.

In the embodiment shown in FIG. 7, the second part 32 includes a wedge-shaped block 320 and an isolation plate 322 that are connected. The second driving inclined plane 321 is formed on one side surface of the wedge-shaped block 320, and the isolation plate 322 is used for isolating the magnetic adsorption part 21 and the magnetic adsorption fitting part 11. The length direction of the isolation plate 322 is consistent with the second direction, and the width of the isolation plate 322 is not limited, and can be selected according to actual needs. In some embodiments, the width size of the isolation plate 322 can be arranged as being capable of isolating the two groups of magnetic adsorption parts 21 and the magnetic adsorption fitting parts 11, but it is not limited thereto.

In a specific embodiment, in combination with what is shown in FIG. 2 and FIG. 3, the magnetic fitting part 11 and the magnetic adsorption part 21 are arranged as four respectively, the four magnetic fitting parts 11 are arranged at the corners of the square groove, and the magnetic fitting parts 21 are arranged in one-to-one correspondence with the magnetic fitting parts 11. As an example, the second parts 32 can be correspondingly arranged as four, the first part 31 can touch and press the four second parts 32 concurrently, and the four second parts 32 can isolate the four groups of magnetic adsorption parts 21 and the magnetic adsorption fitting parts 11 in one-to-one correspondence. As another example, the second part 32 can be arranged as two, the two second parts 32 are oppositely disposed in the second direction with a gap, and the first part 31 is disposed right above the gap between the two second parts 32. The two second parts 32 can be driven to move away from each other to the magnetic isolation state when the first part 31 is pressed down. Moreover, because the isolation plates 322 of the second parts 32 have a certain width, one isolation plate 322 can isolate the two groups of magnetic fitting parts 11 and the magnetic adsorption parts 21 located at the same side, such that the number of the arranged second parts 32 can be reduced to simplify the structure.

In conjunction with FIG. 4, FIG. 5, and FIG. 7, in some embodiments, the wearable device further includes an elastic member 40, and the elastic member 40 is arranged in the second direction, with one end thereof acting on the second part 32 and the other end acting on the device main body 10. The elastic member 40 is in a compressed state in the magnetic isolation state, and the elastic member 40 is in an extended state in the non-magnetic isolation state. By arranging the elastic member 40, a certain force is required when pressing the first part 31, so as to prevent the users from touching the first part 31 by mistake at the time of wearing, which can cause the detachment of the sub-assembly 20. In addition, since the elastic member 40 has the ability to recover from deformation, the elastic member 40 will immediately reset the first part 31 to an initial position when the external force disappears. The elastic member 40 includes, but not limited to, a compression spring, an elastic V-piece or elastic rubber.

In this embodiment, the elastic member 40 adopts a compression spring. Moreover, in order to ensure the stability of the compression spring after being mounted, the second part 32 further includes a guide post 323 extending in the second direction, and the elastic member 40 is sleeved on the guide post 323. As such, displacement of the elastic member 40 can be avoided. Specifically, one end of the guide post 323 is connected with the wedge-shaped block 320, and the other end is a free end. The guide post 323 is disposed directly below the isolation plate 322 of the guide post 323 and extends in parallel with the isolation plate 322.

Figure 8:
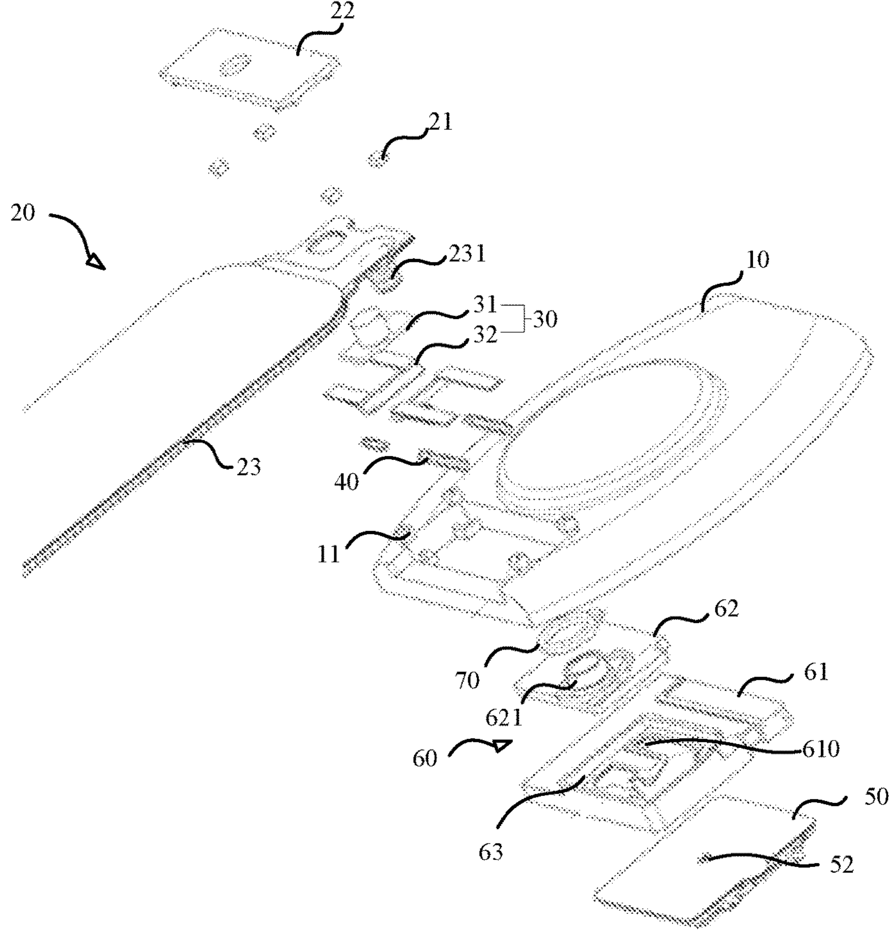
FIG. 8 is an exploded view of a partial structure of a wearable device shown according to some embodiments of the present disclosure.
Figures 9, 10:
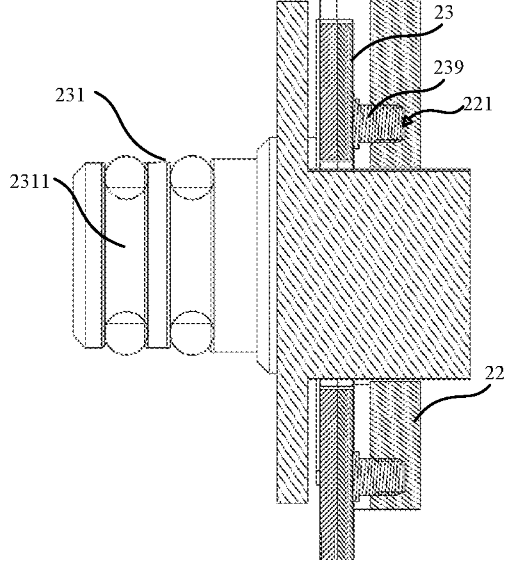
FIG. 9 is a sectional view of an airbag assembly according to some embodiments of the present disclosure.
FIG. 10 is a schematic diagram of an airbag shown according to some embodiments of the present disclosure.

Referring to FIG. 8 and FIG. 9, FIG. 8 is an exploded view of a partial structure of the wearable device 100 showed according to some embodiments of the present disclosure. FIG. 9 is a sectional view of a partial structure of an airbag assembly.

In some embodiments, at least one sub-assembly 20 is provided as an airbag assembly, and the airbag assembly can be used to detect blood pressure of a human body. In a specific embodiment, the airbag assembly includes an airbag cover plate 22 and an airbag 23 arranged at the airbag cover plate 22, the airbag 23 can be detachably connected to the airbag cover plate 22. For example, after the airbag cover plate 22 and the airbag 23 are separated, the airbag cover plate 22 can be separately mounted on the device main body 10 to maintain integrity of the appearance of the wearable device 100. Herein, the magnetic adsorption part 21 can be arranged at the airbag cover plate 22.

In some embodiments, one of the airbag 23 and the airbag cover plate 22 is provided with a positioning post 239, and the other one of the airbag 23 and the airbag cover plate 22 is opened with a positioning hole 221, the positioning post 239 is inserted into the positioning hole 221, such that the airbag 23 is mounted on the airbag cover plate 22, such that detachable connection is realized. For example, the airbag 23 can be provided with two positioning posts 239 thereon, the material of both the positioning posts 239 and the airbag 23 can all adopt TPU (thermoplastic polyurethane elastomer rubber), the airbag cover plate 22 is correspondingly provided with two positioning holes 221, and the positioning posts 239 are inserted into the positioning holes 221 to connect the airbag 23 with the airbag cover plate 22. In addition, the connection between the positioning posts 239 and the positioning holes 221 can be an interference fit, which makes the connection between the airbag 23 and the airbag cover plate 22 more stable.

In some other embodiments, the airbag 23 and the airbag cover plate 22 can also adopt the manner of being clamped or snap-fitted. For example, one of the airbag 23 and the airbag cover plate 22 is provided with a clamping part, and the other of the airbag 23 and the airbag cover plate 22 is provided with a clamping fitting part, the clamping part and the clamping fitting part are clamped, so as to realize the detachable connection between the airbag 23 and the airbag cover plate 22.

Figure 11:
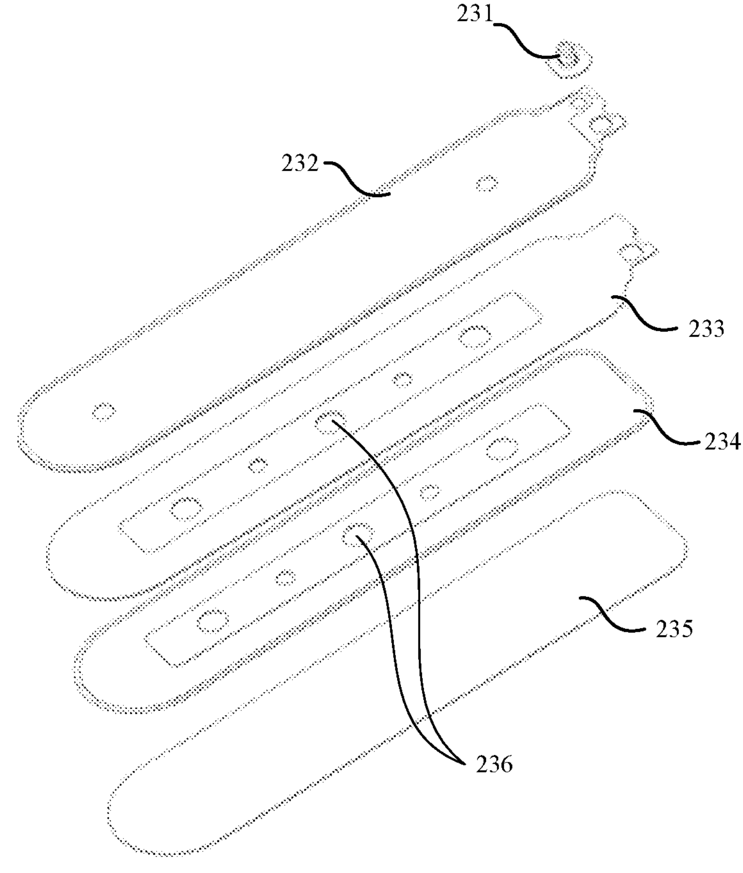
FIG. 11 is an exploded view of the airbag shown in FIG. 10.
Figure 12:
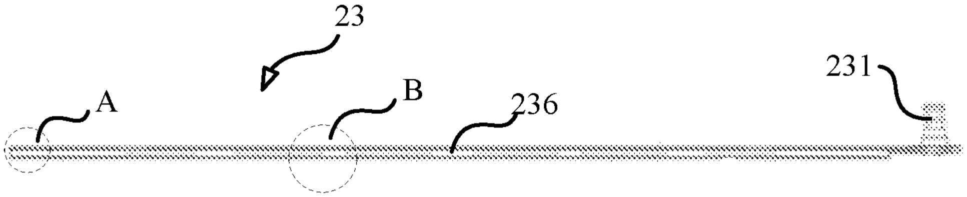
FIG. 12 is an A-A view in FIG. 10.
Figure 13:
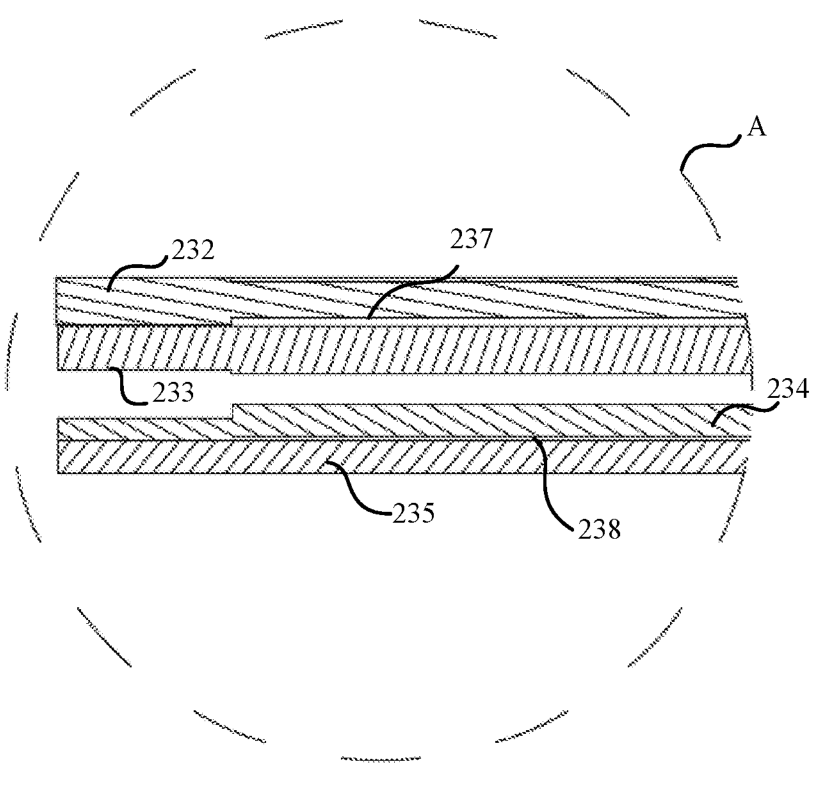
FIG. 13 is an enlarged view of the part A in FIG. 12.
Figure 14:
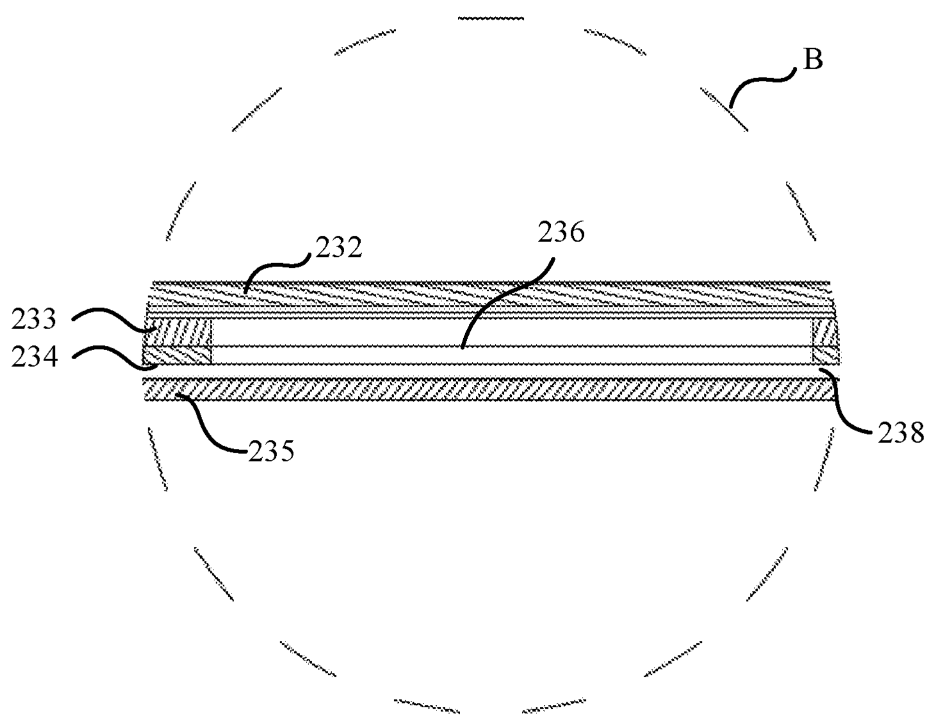
FIG. 14 is an enlarged view of the part B in FIG. 12.

Referring to FIG. 10 to FIG. 14, FIG. 10 is a schematic diagram of the airbag 23 shown according to some embodiments of the present disclosure. FIG. 11 is an exploded view of the airbag 23 shown in FIG. 10. FIG. 12 is an A-A view in FIG. 10. FIG. 13 is an enlarged view of the part A in FIG. 12. FIG. 14 is an enlarged view of the part B in FIG. 12.

The airbag 23 includes an air nozzle 231, and the airbag 23 can be inflated and deflated through the airbag 23. The air nozzle 231 can be disposed at one end of the airbag 23, but it is not limited thereto. For example, the outer side wall of the gas nozzle 231 can be provided with an annular groove structure, and a sealing ring 2311 (refer to FIG. 9) can also be installed on the annular groove structure for the interference fit with the circumference of the gas nozzle installation part of the device main body 10, so as to seal the gas nozzle 231. As such, the sealing between the gas nozzle 231 and the device main body 10 can be improved when the gas nozzle 231 is inserted into the device main body 10 of the wearable device, thereby the accuracy of blood pressure detection can be further improved. The gas nozzle 231 can be made by adopting the TPU (thermoplastic polyurethane elastomer) material, but it is not limited thereto.

In some embodiments, the airbag 23 includes a first sheet 232, a second sheet 233, a third sheet 234, and a fourth sheet 235. The first sheet 232 and the second sheet 233 are fixedly connected at their respective peripheral edge regions to form a first cavity 237. The third sheet 234 and the fourth sheet 235 are fixedly connected at their respective peripheral edge regions to form a second cavity 238. The second sheet 233 and the third sheet 234 are joined, and a through hole 236 is opened in the joint region, and the first cavity 237 and the second cavity 238 are connected with the second cavity 238 via the through hole 236. In this way, the airbag 23 is made to be formed with multiple cavities, which can increase the capacity of the airbag 23, and good pressure stability and high measurement accuracy can be achieved. The first sheet 232, the second sheet 233, the third sheet 234 and the fourth sheet 235 are made by adopting the TPU (thermoplastic polyurethane elastomer) material, but it is not limited thereto. A sheet with a thickness of 0.2 mm can be used, the first sheet 232 and the second sheet 233 can be bonded by hot pressing, the third sheet 234 and the fourth sheet 235 can be bonded by hot pressing, and the hot pressing width is greater than 1 mm.

The first cavity 237 and the second cavity 238 are arranged in upper and lower layers to form a laminated structure, and the first cavity 237 and the second cavity 238 are connected with each other, such that it is convenient to inflate and deflate the first cavity 237 and the second cavity 238 and reduce the resistance of air flow.

Figure 15:
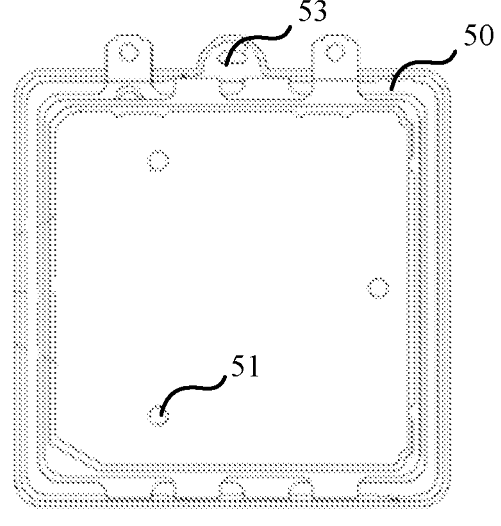
FIG. 15 is a schematic diagram of a top surface of an air pump shown according to some embodiments of the present disclosure.
Figures 16, 17:
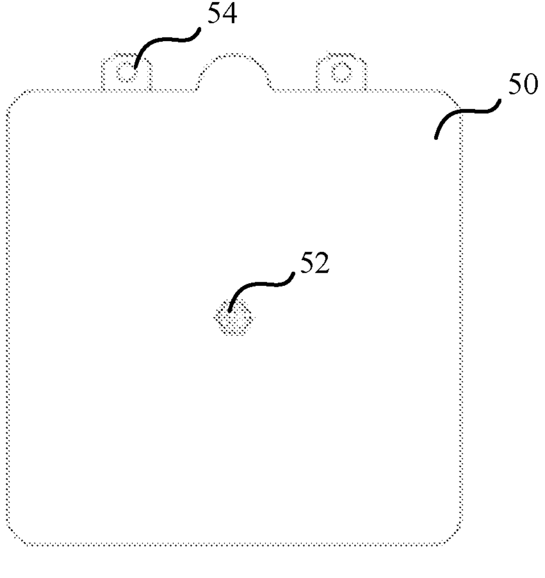
FIG. 16 is a schematic view of a bottom surface of the air pump shown in FIG. 15 according to some embodiments of the present disclosure.
FIG. 17 is a flowchart of an identification method for an add-on assembly according to some embodiments of the present disclosure.

In conjunction with FIG. 8, FIG. 15, and FIG. 16, FIG. 15 is a schematic diagram of a top surface of an air pump shown according to some embodiments of the present disclosure. FIG. 16 is a schematic view of a bottom surface of the air pump shown in FIG. 15.

The wearable device 100 further includes an air pump 50 and an air pump bracket 60. The air pump 50 is disposed inside the device main body 10, and it can provide kinetic energy and play the roles of inflation and deflation. The air pump bracket 60 is used for mounting the air pump 50. The air nozzle 231 is connected with the air pump 50. In some embodiments, the gas nozzle 231 and the air pump 50 are respectively disposed at two sides of the device main body 10, the device main body 10 is provided with a mouth where the gas nozzle 231 is connected with the air pump 50, and the gas nozzle 231 is connected, through the mouth, with the air pump 50 located at the other side of the device main body 10.

The top surface of the air pump 50 is provided with one or more air inlets 51, the bottom surface of the air pump 50 is provided with a first air outlet 52, and the side surface of the air pump 50 is further provided with a second air outlet 53. The first air outlet 52 is provided as one, and it is connected with the air nozzle 231 of the airbag 23.

The airbag 23 includes an inflated state and a deflated state. In the inflated state, the air inlet 51 is connected with the first air outlet 52 and the airbag 23, and in this case, the air pump 50 can suck air from the inside of the device main body 10 and deliver gas to the airbag 23. In the deflated state, the airbag 23 is connected with the first air outlet 52 and the second air outlet 53, and in this case, the gas in the airbag 23 can be released to the inside of the apparatus main body 10. The second air outlet 53 can be arranged as one or more. Both sides of the second air outlet 53 of the air pump 50 can be respectively provided with a pad 54 for realizing the electrical connection between the air pump 50 and the overall machine.

As shown in FIG. 8, in some embodiments, the air pump bracket 60 includes an air pump upper bracket 61 and an air pump lower bracket 62. The upper bracket 61 of the air pump is provided with an opening 610, the air pump 50 is installed on the upper bracket 61 of the air pump, and the first air outlet 52 is aligned with the opening 610, such that the gas in the air pump 50 can be delivered to the airbag 23 through the first air outlet 52 and the opening 610. The lower bracket 62 of the air pump is installed on the upper bracket 61 of the air pump, in which the upper bracket 61 and the lower bracket 62 of the air pump can be fixed at the surrounding positions with double-sided adhesive, or welding, dispensing, etc. can also be adopted. This embodiment makes no specific limitations. The air pump upper bracket 61 and the air pump lower bracket 62 are both opened with grooves to form an air flow channel 63, and the air pump lower bracket 62 is also provided with an airway exhaust port 621, the airway exhaust port 621 is connected with the air flow channel 63 and the air bag 23, such that gas can flow into the air bag 23 through the air pump bracket 60. In addition, a sealing sleeve 70 can be arranged around the airway exhaust port 621 of the lower bracket 62 of the air pump, the sealing sleeve 70 can be fixed on the lower bracket 62 of the air pump by a double injection molding process, so as to press and seal with the device main body 10 in the Z direction (refer to FIG. 5), in which the Z direction is the thickness direction of the device main body 10.

When the airbag 23 is inflated, the air pump 50 sucks air from the device main body 10, the gas can enter the airflow channel 63 from the first air outlet 52 of the air pump 50, then flow into the gas nozzle 231 through the airflow channel 63, and finally flow into the airbag 23 through the gas nozzle 231 to realize inflation. Conversely, when the airbag 23 is deflated, the airbag 23 is deflated through the gas nozzle 231, and the gas flows into the first air outlet 52 through the gas flow channel 63, and finally flows out into the device main body 10 through the second air outlet 53. In this way, gas circulation can be realized without exchanging gas with the outside, the tightness of the device main body 10 and the airbag 23 is ensured, the accuracy of blood pressure measurement is improved, and thus the satisfaction of users is improved.

Referring to FIG. 17, FIG. 17 is a flowchart of an identification method for an add-on assembly.

The present disclosure further provides an identification method for an add-on assembly, including steps S10, S20 and S30.

Step S10: acquiring a magnetic field signal when the magnetic adsorption part 21 is attached on the device main body 10. There is a magnetic attraction force between the magnetic adsorption part 21 and the magnetic adsorption fitting part 11 of the device main body 10, and because the magnetic adsorption parts 21 of respective sub-assemblies 20 are different, the magnetic field signals acquired by the magnetic field sensor are different. Different implementations for realizing the magnetic adsorption part 21 will not be described here.

Step S20: identifying a sub-assembly 20 according to the magnetic field signal. Because the magnetic adsorption parts 21 of any two sub-assemblies 20 are different, the magnetic field signals of the magnetic adsorption parts 21 of any two sub-assemblies 20 are also different, and the sub-assemblies 20 can be identified according to the magnetic field signals.

In this step, feature information corresponding to each sub-assembly 20 can be configured, and whether the magnetic field signal corresponds to the feature information can be determined by comparing the identified magnetic field signal with the feature information, so as to achieve the purpose of identifying the sub-assembly 20 according to the magnetic field signal.

Step S30, comparing an identified sub-assembly 20 with a predetermined sub-assembly, and outputting indication information according to a comparison result.

In this step, the predetermined sub-assembly refers to the sub-assembly selected in advance by the users according to their own situations. For example, the sub-assembly can be predetermined as an airbag sub-assembly when the user needs to measure blood pressure from time to time, the identified sub-assembly 20 can be compared with the predetermined sub-assembly in the later use process, and then prompt information after comparison can be given. For example, prompt information such as "Correct" and "ok" can be outputted if the comparison result is being the same, and prompt information such as "Error" and "Please replace the sub-assembly" can be outputted if the comparison result is being different.

In some embodiments, the identification method further includes: enabling an add-on program corresponding to the identified sub-assembly according to the identified sub-assembly if the comparison result is being the same.

In this step, when the identified sub-assembly is consistent with the predetermined sub-assembly, in this case, an additional program corresponding to the sub-assembly 20 can be enabled according to the identified sub-assembly 20. For example, the air pump 50 can be controlled to inflate the airbag 23 when the identified sub-assembly is an airbag assembly, so as to enable the blood pressure detection function.

The present disclosure provides an add-on assembly, an identification method for an add-on assembly, and a wearable device, in which the add-on assembly includes multiple sub-assemblies, the magnetic adsorption parts of respective sub-assemblies are different, respective different sub-assemblies can be identified by the device main body of the wearable device through their own magnetic adsorption parts, thus realizing the identification function of the wearable device to the add-on assembly.

The above described are only the optional embodiments of the present disclosure, and are not intended to limit the present disclosure. Any modification, equivalent substitution, improvement, etc. made within the spirits and principles of the present disclosure should be included in the scope of protection of the present disclosure.

The invention claimed is:

1. An add-on assembly, comprising:

multiple different sub-assemblies, wherein each of the sub-assemblies comprises a magnetic adsorption part, the magnetic adsorption part of each of the sub-assemblies is used for adsorbed-connection with a device main body of a wearable device, the magnetic adsorption parts of any two of the sub-assemblies are different, and each of the sub-assemblies is identified by the device main body through the magnetic adsorption part, wherein the multiple different sub-assemblies are configured to realize additional functions other than main functions of the device main body.

2. The add-on assembly according to claim 1, wherein the magnetic adsorption parts of any two sub-assemblies are different in at least one of the following ways:

each magnetic adsorption part is a permanent magnet, and polarities of the magnetic adsorption parts of any two sub-assemblies are different;

numbers of the magnetic adsorption parts of any two sub-assemblies are different;

positions of the magnetic adsorption parts of any two sub-assemblies are arranged differently; and each of the magnetic adsorption parts comprises an adsorption surface, and areas of the adsorption surfaces of the magnetic adsorption parts of any two sub-assemblies are different.

3. The add-on assembly according to claim 1, wherein the magnetic adsorption part of each of the sub-assemblies is configured as a permanent magnet or a magnetic conductor; or at least one of the sub-assemblies comprises multiple magnetic adsorption parts, the multiple magnetic adsorption parts comprising at least one permanent magnet and at least one magnetic conductor.

4. The add-on assembly according to claim 1, wherein at least one of the sub-assemblies is configured as an airbag assembly for measuring blood pressure.

5. The add-on assembly according to claim 4, wherein at least two of the sub-assemblies are configured as the airbag assemblies, and models of the respective airbag assemblies are different.

6. The add-on assembly according to claim 4, wherein the airbag assembly comprises an airbag, the airbag comprises a first cavity and a second cavity that are disposed in a laminated manner, and the first cavity and the second cavity are connected.

7. The add-on assembly according to claim 6, wherein the airbag further comprises a first sheet, a second sheet, a third sheet, and a fourth sheet, the first sheet and the second sheet are fixedly connected at their respective peripheral edge regions to form the first cavity, the third sheet and the fourth sheet are fixedly connected at their respective peripheral edge regions to form the second cavity, the second sheet is joined with the third sheet at a joint region comprising a through hole, and the first cavity is connected with the second cavity through the through hole.

8. A wearable device, comprising:

a device main body comprising a magnetic field sensor, a processor, and a magnetic adsorption fitting part; and an add-on assembly, comprising multiple different sub-assemblies, wherein each of the sub-assemblies comprises a magnetic adsorption part, the magnetic adsorption part of each of the sub-assemblies is used for adsorbed-connection with a device main body of a wearable device, the magnetic adsorption parts of any two of the sub-assemblies are different, and each of the sub-assemblies is identified by the device main body through the magnetic adsorption part, wherein the magnetic adsorption fitting part is configured to be in the absorbed-connection with the magnetic adsorption part of one of the sub-assemblies, the magnetic field sensor is used for acquiring a magnetic field signal when the magnetic adsorption part and the magnetic adsorption fitting part are in an adsorbed state, and outputting the magnetic field signal to the processor, and the processor is configured to identify the one of the sub-assemblies according to the magnetic field signal, wherein the multiple different sub-assemblies are configured to realize additional functions other than main functions of the device main body.

9. The wearable device according to claim 8, wherein the device main body comprises a plurality of magnetic adsorption fitting parts and a plurality of magnetic field sensors, the plurality of magnetic field sensors and the plurality of magnetic adsorption fitting parts are disposed in one-to-one correspondence with each other, the magnetic adsorption part of the sub-assembly is selectively adsorbed with at least one of the plurality of magnetic adsorption fitting parts correspondingly, and the plurality of magnetic field sensors acquire respectively the magnetic field signal when the corresponding magnetic adsorption fitting parts and the magnetic adsorption part are in the adsorbed state and output the magnetic field signal to the processor.

10. The wearable device according to claim 8, wherein the device main body comprises a plurality of magnetic adsorption fitting parts and one magnetic field sensor, the magnetic adsorption part of the sub-assembly is selectively adsorbed with at least one of the plurality of the magnetic adsorption fitting parts correspondingly, and the one magnetic field sensor is used for acquiring the magnetic field signal when the magnetic adsorption part and the at least one of the plurality of magnetic adsorption fitting part are in the adsorbed state and outputting the magnetic field signal to the processor.

11. The wearable device according to claim 8, wherein the wearable device further comprises a magnetic isolation assembly, the magnetic isolation assembly is movably disposed between the magnetic adsorption part and the magnetic adsorption fitting part, the magnetic isolation assembly is configured to work in a magnetic isolation state or a non-magnetic isolation state, the magnetic adsorption part and the magnetic adsorption fitting part attract each other in the non-magnetic isolation state, such that the sub-assembly is installed on the device main body, and the magnetic isolation assembly isolates the magnetic adsorption part and the magnetic adsorption fitting part in the magnetic isolation state, such that the sub-assembly is detachable from the device main body.

12. The wearable device according to claim 11, wherein the magnetic isolation assembly comprises a first part and a second part disposed separately, the first part is movably disposed in the sub-assembly, the second part is movably disposed in the device main body, and the first part is configured to drive the second part to move to make the magnetic isolation assembly work in the magnetic isolation state under an action of an external force.

13. The wearable device according to claim 12, wherein the first part moves in a first direction, the second part moves in a second direction different from the first direction, and the first part is configured to touch and press the second part, such that the second part moves to make the magnetic isolation assembly work in the magnetic isolation state in the second direction.

14. The wearable device according to claim 13, wherein the first part comprises a first driving inclined plane, and the first part touches and presses the second part through the first driving inclined plane, such that the second part moves to make the magnetic isolation assembly work in the magnetic isolation state in the second direction; and/or the second part comprises a second driving inclined plane, and the first part touches and presses the second part through the second driving inclined plane, such that the second part moves to make the magnetic isolation assembly work in the magnetic isolation state in the second direction.

15. The wearable device according to claim 14, wherein the wearable device further comprises an elastic member, the elastic member is disposed in the second direction, an end of the elastic member acts on the second part and another end of the elastic member acts on the device main body, the elastic member is in a compressed state in the magnetic isolation state, and the elastic member is in an extended state in the non-magnetic isolation state.

16. The wearable device according to claim 15, wherein the second part comprises a guide post extending in the second direction, and the elastic member is sleeved on the guide post.

17. The wearable device according to claim 12, wherein the add-on assembly comprises multiple magnetic adsorption parts and multiple magnetic adsorption fitting parts arranged in one-to-one correspondence, and multiple second parts, the first part is configured to drive the multiple second parts to move to make the magnetic isolation assembly work in the magnetic isolation state under an action of an external force, such that the multiple corresponding magnetic adsorption parts and the multiple magnetic adsorption fitting parts are isolated.

18. The wearable device according to claim 8, wherein the add-on assembly comprises an airbag, the wearable device comprises an air pump, the air pump is disposed inside the device main body, the air pump comprises an air inlet, a first air outlet and a second air outlet, the first air outlet is connected with the airbag, the airbag is configured to work in an inflated state or a deflated state, the air inlet is connected with the airbag through the first air outlet in the inflated state, and the airbag is connected with the second air outlet through the first air outlet in the deflated state.

* * * * *